E. ADRIAN.
LOCK.
APPLICATION FILED NOV. 28, 1914.

1,204,727.  Patented Nov. 14, 1916.

Witnesses  
Inventor  
Elmer Adrian

UNITED STATES PATENT OFFICE.

ELMER ADRIAN, OF ST. LOUIS, MISSOURI.

LOCK.

1,204,727.

Specification of Letters Patent.

Patented Nov. 14, 1916.

Application filed November 28, 1914. Serial No. 874,568.

*To all whom it may concern:*

Be it known that I, ELMER ADRIAN, a citizen of the United States, residing in the city of St. Louis and State of Missouri, have invented certain new and useful Improvements in Locks, of which the following is a specification.

My invention relates to locks and more particularly to that type applicable to steering shafts of automobiles.

The primary object of my invention resides in the provision of a novel means permanently associated with a steering rod or shaft of an automobile for engagement with the rod for preventing the rotation of the rod, thus preventing the control of the vehicle, the locking means having novel means associated therewith for normally holding the same in engagement with the rod.

Another object of my invention resides in the provision of a novel operating means for the locking means, the operating means being actuatable by a suitable key, the latter placing the operating element in an operative position when engaged therewith.

A further object of my invention resides in the provision of a novelly constructed base plate having one of the sections of the lock body formed integral therewith, the sections being provided with complemental means for facilitating the reception and mounting of the locking and operating means.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

Figure 1:
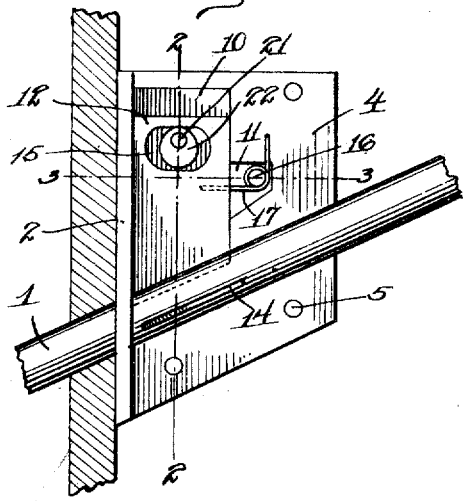
Figure 2:
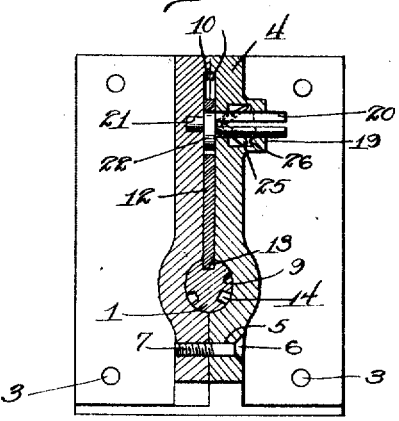
Figure 3:
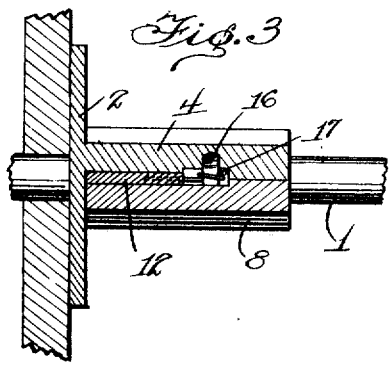
Figure 4:
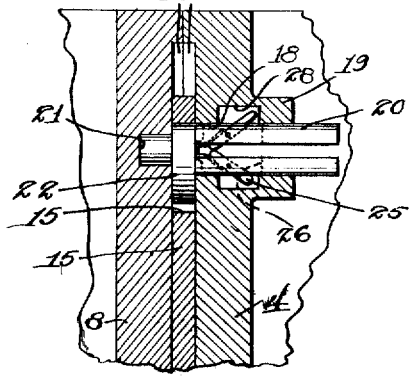
Figure 5:
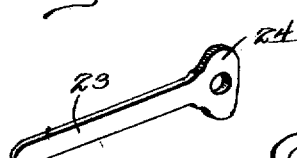

In the drawings: Figure 1 is a side elevational view of my invention showing one of the sections removed; Fig. 2 is a transverse sectional view of my invention taken on the line 2—2 of Fig. 1; Fig. 3 is a transverse sectional view of my invention taken on the line 3—3 of Fig. 1: Fig. 4 is an enlarged fragmentary sectional view of the upper part of Fig. 2 showing to advantage the specific construction of the operating element and the means therein for preventing the same from being actuated preparatory to the insertion of the key; and Fig. 5 is a perspective view of the form of key used for operating my invention.

Referring more particularly to the drawings in which similar reference numerals designate like or corresponding parts throughout the different views, I provide a steering rod 1 for an automobile or other vehicle, the rod having received thereabout my improved base plate 2. The plate 2 is arranged so that the rod extends at an acute angle therefrom suitable for actuating purposes for the vehicle, the plate being provided adjacent its corners with a plurality of openings 3 for receiving suitable fastening devices, not shown, for facilitating the securing of the plate to the dashboard of the vehicle.

Formed integral with and extending at substantially right angles from the plate 2 is one of the sections 4 of the body of my improved lock, the latter being provided with suitable openings 5 for the reception of suitable screws or like fastening devices 6, which screws are engaged in registering openings 7 in the other of the sections 8 of the lock body, the latter having its outer edges arranged in alinement with the outer edges of the section 4. Both of the sections 4 and 8 are depressed on their inner surfaces about the steering rod 8 to provide arcuate grooves 9 which, when the sections are secured in the manner described, constitute an opening for guiding and supporting the rod 1. Communicating with the grooves 9 on the inner surfaces of the grooves 4 and 8 are vertically extending and complemental recesses 10, the latter terminating at a point adjacent the upper edges of the sections and have their side edges arranged in parallel relation with the side edges of the section as is clearly illustrated to advantage in Fig. 1 of the accompanying drawings. Extending from the outer side edges of the recesses 10 into the sections 4 and 8 of the lock body are complemental recesses 11 for a purpose to be hereinafter referred to. Slidably mounted in the complemental recesses 10 is my improved locking plate or bolt 12, the lower edge of which is cut diagonally and beveled as at 13 so that this end may readily and easily engage one of the longitudinally arranged slots 14 in the steering rod for locking purposes when desired. The upper end of the plate 12 is provided with a substantially oval shaped opening 15 for a purpose to be hereinafter referred to.

In order to normally hold the plate 12 in locking engagement with one of the slots 14 in the steering rod 1, I have positioned a suitable fastening device, preferably a screw stud 16 in the complemental recesses 11 with the sections 4 and 8 and secured the rounded end of the element in the section 4. Disposed about the stud 16 is a suitable elastic element 17 which in this instance includes a piece of resilient wire comprising a coil for engagement with the stud, the coil having arms extending therefrom and arranged at right angles to each other, the arms being engageable with the locking plate 12 and the section 4 of the body, respectively. By this arrangement it can be seen that because of the resiliency of the material from which the element is formed that the plate 12 will at all times be held in yieldable engagement with the rod 1 and will prevent the surreptitious rotating of the rod.

In order to remove the plate 12 from engagement with the rod 1, I have provided the section 4 adjacent the upper end thereof with an opening 18, the opening having a collar 19 formed thereabout and integral with the under surface of the section 4. Rotatably mounted in the opening 18 is my improved operating element 20, the latter being substantially circular in form and has the inner end thereof reduced and journaled in the recess 21 in the section 8 at a point opposite the opening 18. Formed integral with the element 20 adjacent the reduced end thereof is a suitable cam 22, the latter being substantially flat and of a thickness slightly less than the width of the complemental recesses 10 when the latter are in registration, the cam being also positioned within the substantially oval-shaped opening 15 in the plate and it can be seen that when the element 20 is rotated the cam will engage the upper end of the opening and lift the plate against the tension of the elastic element 17 from the slot 14 in the rod, thus permitting the rod 1 to be rotated at the will of the operator. In order to rotate the operating element, I have bifurcated the outer end thereof so that the same may receive the elongated flattened shank 23 of a suitable key 24. Suitable means have been provided for preventing surreptitious rotation of the operating element 20 and it constitutes in this instance a pair of tumblers 25 which are pivotally mounted intermediate their ends in diametrically arranged slots 26 in the bifurcations, the tumblers 25 being normally held in the path of the shank of the key 23 by means of a suitable elastic element preferably a substantially U-shaped spring 27, the latter being rigidly mounted at the inner end of the bifurcation. The outer ends of the tumblers 25 are positioned normally within the diametrically arranged recesses 28 provided in the opening and the collar, the recesses 28 being arranged to aline with the slots 26. It can be seen that when the key is inserted in engagement with the inner ends of the tumblers 25 it causes the outer ends of the tumblers to be automatically removed from the recesses 28 and permits of the rotation of the element 20 consequently allowing the plate 12 to be raised from the slots 14.

The operation of my invention is a follows: When it is desired to actuate the steering rod 1 of a vehicle and assuming that the lock is in the position shown in Fig. 1, all that is necessary is to insert the shank 23 of the key 24 between the bifurcations and the operating element or spindle 20, whereupon the inner end of the key will engage the inner ends of the pins, causing the same to be automatically removed from the recesses 28 which permits the free rotation of the element 20. When the element 20 is rotated through the medium of the outer end of the key, the cam 22 will engage the upper edge of the oval shaped opening 15 and cause the locking plate 12 to be removed from the slot 14 in the rod 1 and against the tension of the elastic element 17. In relocking the rod all that is necessary is to turn the key whereupon the elastic element 17 will cause the plate 12 to engage the desired slot in the rod and when the key is removed the tumblers 25 will automatically assume their normal positions within the recesses 28, care being taken during this operation that the slots 26 are arranged in alinement with the recesses 28.

Although I have shown and described the preferred embodiment of my invention, I desire it to be understood that I am not to be limited to the exact details shown; however, I desire that great stress be laid upon the arrangement of the peculiarly formed locking plate that can be associated with the rod of an automobile so that the wheels may be turned to either the right or left or arranged in a straight path, the locking plate having novel means associated therewith for facilitating the removal of the same against the tension of the resilient means which normally holds the same in a locked position.

From the above description taken in connection with the accompanying drawings, it can easily be seen that I have provided a device that is simple in construction, containing but a few simple parts that can be cheaply manufactured and assembled and when assembled can be placed upon the market at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:

1. The combination with a steering rod of a vehicle, having a plurality of slots therein, and a dash-board, of a base plate disposed about the steering rod and secured to the dash-board, a sectional lock body clamped about the rod and having one section integral with the base plate, a locking plate slidably mounted between the sections of the lock body for removable engagement with the slots in the rod, resilient means for holding the locking plate in engagement with one of the slots in the rod, a spindle rotatably mounted in the body and associated with the locking plate so as to impart a sliding movement to the plate against the tension of the resilient means, locking means mounted in the spindle for engagement with the lock body for preventing rotation of the spindle, other resilient means for normally holding the locking means and the spindle in engagement with the body, and a key engageable with the body for releasing the locking means and for rotating the spindle to consequently slide the locking plate and release the rod.

2. The combination with the steering rod of a vehicle having a plurality of slots therein and a dashboard, of a base plate disposed about the steering rod and secured to the dashboard, a lock body including two sections disposed about the rod and one of which is formed integral with the plate, said sections being provided with complementary registering recesses on their inner faces, a plate slidably mounted in said recesses for engagement with one of the slots in the rod for preventing the rotation of the rod, said plate being provided with a substantially oval-shaped opening, a spring member mounted between the sections and in engagement with the plate for normally holding the plate in engagement with one of the recesses, an actuating spindle rotatably mounted in one of said sections and having the inner end reduced and extended through the opening into the other of the sections, a cam mounted on the reduced end and disposed in the opening for raising the plate when the spindle is rotated, means for preventing rotation of the spindle and means for rotating the spindle.

In testimony whereof I affix my signature in presence of two witnesses.

ELMER ADRIAN.

Witnesses:
 H. A. YONGE,
 JAS. H. BROWN.